June 17, 1969 R. F. ANDERSON 3,450,621
CHLORINE CELL WITH FLEXIBLE ELASTOMERIC COVER
Filed Nov. 21, 1966

INVENTOR.
RALPH F. ANDERSON
BY
W. A. Shira Jr.
ATTY.

United States Patent Office 3,450,621
Patented June 17, 1969

3,450,621
CHLORINE CELL WITH FLEXIBLE ELASTOMERIC COVER
Ralph F. Anderson, Akron, Ohio, assignor to The B. F. Goodrich Company, New York, N.Y., a corporation of New York
Filed Nov. 21, 1966, Ser. No. 595,776
Int. Cl. B01k 3/00; C01b 7/06
U.S. Cl. 204—219                    5 Claims

ABSTRACT OF THE DISCLOSURE

An improved flexible sheet rubber cover for sealing the electrolyte tank of a De Nora type chlorine generating cell. Rubber materials of different compositions are used for the opposite surfaces of the cover with the inside surface composed of a natural rubber compound and the outside surface composed of an ethylene-propylene terpolymer rubber.

BACKGROUND OF THE INVENTION

This invention relates to a cover for a free chlorine generating cell and, in particular, relates to a flexible rubber cover for a De-Nora type chlorine generating cell. This type of cell uses an electrolytic process for producing free chlorine gas from sodium chloride. In such a cell, carbon electrodes are employed for the anode and a pool of mercury is the cathode. The carbon anodes enter the tank by passing vertically through the cover and are adjustably mounted to permit maintenance of a constant electrolytic gap. The chlorine gas is evolved at the anodes and hence it is necessary to provide a seal between the anodes and the cover to prevent the gas from escaping except through the discharge opening. The cover must, therefore, not only seal around the adjustable anodic electrodes but also at the periphery of the tank. It must also remain flexible to permit electrode adjustment.

The De-Nora type cell operates continuously with an electrolyte temperature in the order of 180° to 190° F. Therefore, the flexible cover is subjected to the continuous corrosive attack of hot chlorine gas on the surface thereof disposed on the inside of the tank. In addition, a high concentration of ozone is present in the region around the anodic electrodes on the outside surface of the cover. This subjects the flexible rubber cover to two different corrosive media simultaneously on opposite sides. Previously this environment has caused early failure of the covers by deterioration from heat and corrosive attack.

During operation of the De-Nora type cell, salt deposits from the brine electrolyte form on the under surface of the cover. These deposits, when present in the form of a continuous scale, serve as a protective coating in preventing further corrosive attack by the chlorine gas. However, one of the problems encountered in operating the De-Nora type cell has been separation of the scale from the underside of the cover. This results in portions of the scale falling into the brine thereby contaminating the electrolyte as well as exposing the cover to further corrosive attack.

SUMMARY OF THE INVENTION

The present invention remedies the above-mentioned difficulties of prior De-Nora type cell covers by providing an improved flexible cover of elastomeric material characterized by having different compositions on the inner and outer surfaces, thereby affording improved resistance of the outer surface to ozone and improved resistance of the inner surface to corrosive attack of hot chlorine gas, as well as improved the capability of the inner surface to retain electrolytic salt scale and thereby further protect the cover from corrosion.

These and other novel features of the invention will become apparent from the following description of the presently preferred embodiment and certain modifications thereof described with reference to the accompanying drawings forming a part of the application.

DETAILED DESCRIPTION

Figure 2:
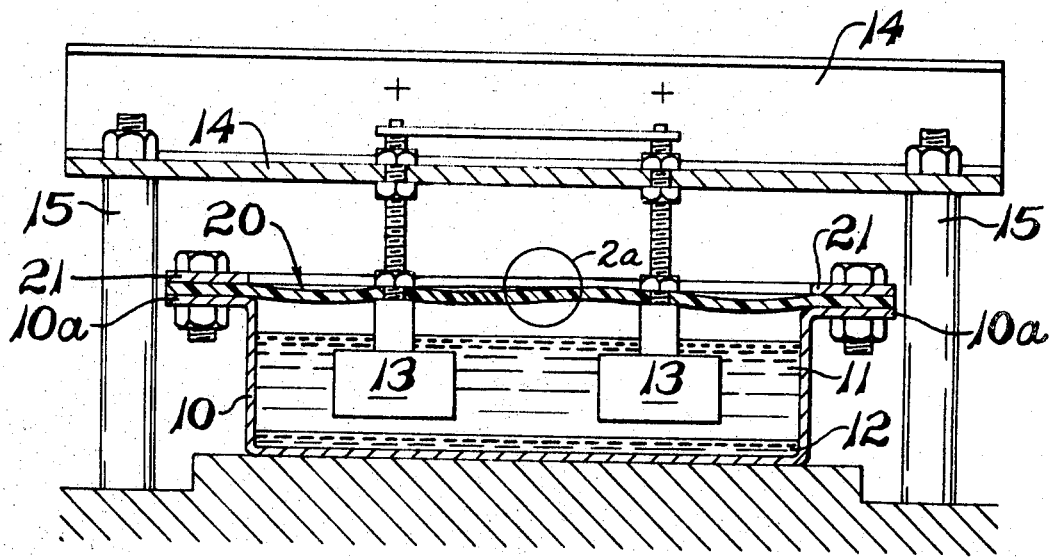
FIG. 2 is a transverse sectional view taken along the section-indicating lines 2—2.
Figure 2A:
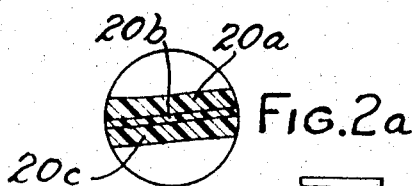
FIG. 2a is an enlarged cross sectional view of the cover taken from within the circle 2a of FIG. 2.
Figure 1:
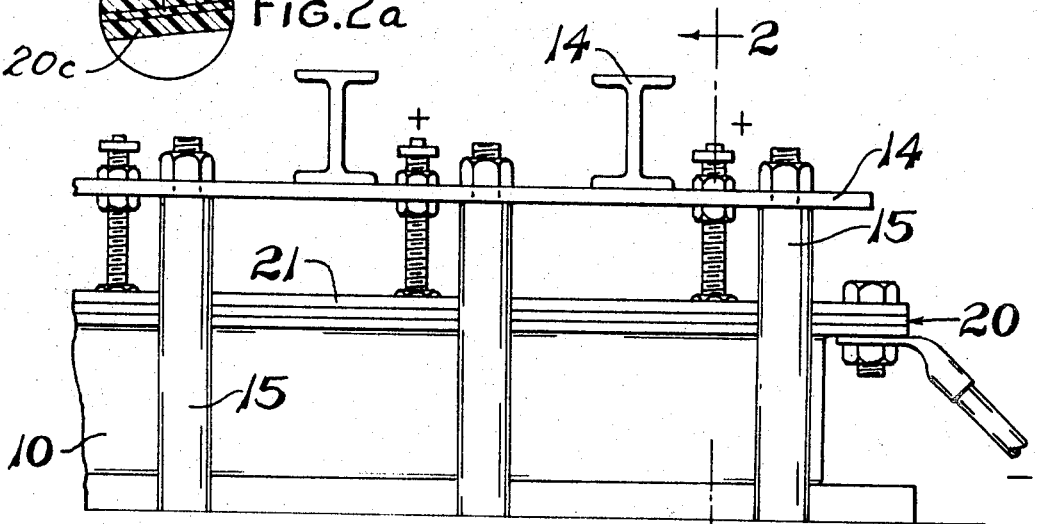
FIG. 1 is a partial side view in elevation showing the preferred embodiment of the invention installed in a De-Nora chlorine generating apparatus.

As shown in the drawings, the De-Nora cell is illustrated as including a tank 10 having a flat horizontal rim flange 10a around the periphery of the open top. The cell is shown as partially filled with brine electrolyte 11 overlying the cathodic electrode 12 which consists of a thin layer of mercury covering the bottom of the tank. The several adjustable spaced anodic electrodes are made of cylindrical carbon blocks 13 suspended from overhead rigid supporting structure 14, here shown as a plate reinforced with I-beams which is independently supported by vertical pillars 15 spaced uniformly around the electrolyte tank. The carbon anodes are secured vertically in an adjustable manner by mechanical fastening means, preferably threaded shafts and lock nuts, to facilitate maintaining a constant gap between the lower ends of the anode and the mercury cathode. The cell has a flexible cover 20 which is sealed around the flange 10a of the tank by being compressed intermediate the clamping frame 21 and the flange 10a. External securing means, preferably machine bolts and nuts with the bolts passing through matching holes in the frame, cover and flange are employed to compress the cover between the frame and the flange. The cover is also provided with holes for the anodes to pass therethrough in the illustrated embodiment. The anodes have a threaded portion extending through the last-mentioned holes with sealing between each anode and the flexible cover being effected by the locknuts on the threaded portions tightened sufficiently to clamp the cover between the said nuts and the integral shoulders on the anodes.

The improved flexible cover is shown in its presently preferred embodiment in the form of a unitary sheet of layers of different elastomeric material integrally united by being vulcanized together. The upward or outside layer 20a is of uniform thickness and is made of ethylene-propylene terpolymer material having trans-1,4 hexadiene as the third monomer. The downward or inside layer 20c is also of uniform thickness and is made of a natural rubber composition. A thin tie-gum layer 20b, made of chlorinated butyl rubber, is disposed between the inner and outer layers to facilitate bonding these together by vulcanization. Preferably, the composite cover has a thickness in the range of 0.125 to 0.200 inch, with the outer layer having a thickness of at least 0.060 inch and a durometer hardness of 60 to 70 on the Shore "A" scale. The inner layer has a minimum thickness of 0.050 inch and a durometer hardness of 65 to 75 on the Shore "A" scale. The intermediate tie layer ranges from 0.020 to 0.040 inch in thickness and has a durometer hardness of 50 to 60 on the Shore "A" scale.

The improved cell cover has exhibited a much longer trouble-free life with fewer difficulties in cell operation, such as contamination, than has heretofore been possible with prior cell covers. The longer life is due to the fact that the ethylene-propylene terpolymer rubber exhibits significantly improved resistance to concentrated high temperature ozone which is present in the vicinity of the electrodes on the outer surface of the cover while the natural rubber on the underside of the cover has high resistance to deterioration by the hot chlorine gas in contact with the surface of the cover, although it has a poorer resistance to deterioration by ozone than the ethylene-propylene terpolymer. Moreover, the capacity of the natural rubber to retain the salt scale from the brine is superior to the scale-retaining capacity of the ethylene-propylene terpolymer so that a protective coating for reducing chlorine attack can be established when the inner surface of the cover is natural rubber.

The ethylene-propylene terpolymer comprising the outer surface of the improved cover may be any of the elastomers presently available under that designation. The inner layer can be not only tree-grown natural rubber but also synthesized "natural rubber" and hence the latter term is used in the generic sense to include both types. Also, while one specific tie-gum has been mentioned in the description for the layer 20b, it will be apparent that other tie-gum compositions can be utilized or the layer 20b can not entirely be omitted if the inner and outer layers are satisfactorily united as an integral sheet. These and further modifications and adaptations not expressly disclosed herein may be made without exceeding the ambit of the invention which is limited only as required by the spirit and scope of the appended claims.

I claim:

1. A free chlorine gas generating cell of the De-Nora type having a flexible elastomeric cover comprising an integral sheet with the upward outer face formed of a layer of ethylene-propylene terpolymer material which is resistant to high concentration of ozone, and the downward inner face formed of a layer of natural rubber material which is resistant to hot chlorine gas.

2. The invention as defined in claim 1 wherein a layer of chlorinated butyl rubber is intermediate said inner and said outer layers.

3. The invention as defined in claim 1 wherein said inner layer has a minimum thickness of 0.050 inch and a durometer hardness in the range of 65–75 on the Shore "A" scale, said outer layer has a minimum thickness of 0.060 inch and a durometer hardness of 60–70 on the Shore "A" scale, and said cover has a thickness in the range 0.125–0.200 inch.

4. The invention as defined in claim 3 wherein the said intermediate layer has a thickness in the range 0.020–0.040 inch and a durometer hardness of 50–60 on the Shore "A" scale.

5. The invention defined in claim 1, wherein the ethylene-propylene terpolymer contains trans-1,4 hexadiene as the third monomer.

References Cited

UNITED STATES PATENTS

| | | | |
|---|---|---|---|
| 2,958,635 | 11/1960 | De Nora | 204—279 |
| 2,998,374 | 8/1961 | Granfors | 204—279 |

ALLEN B. CURTIS, *Primary Examiner.*

D. L. WALTON, *Assistant Examiner.*

U.S. Cl. X.R.

204—279